United States Patent [19]

Babson

[11] Patent Number: 4,978,140
[45] Date of Patent: Dec. 18, 1990

[54] HAND-HELD SKATE SAIL

[76] Inventor: Roger M. Babson, 258 Pt. Pleasant Ave., Bayville, N.J. 08721

[21] Appl. No.: 361,598

[22] Filed: Jun. 5, 1989

[51] Int. Cl.⁵ .................................................. A63C 3/00
[52] U.S. Cl. .................................. 280/810; 114/39.2; 114/102; 280/213; 280/87.042
[58] Field of Search ................... 280/810, 213, 87.042, 280/87.041; 114/39.2, 102

[56] References Cited

U.S. PATENT DOCUMENTS

| | | | |
|---|---|---|---|
| 3,924,870 | 12/1975 | Spivack et al. | 280/810 |
| 4,130,292 | 12/1978 | Lorenz | 280/810 |
| 4,269,133 | 5/1981 | Brown | 280/810 X |
| 4,653,416 | 3/1987 | Debarge | 114/39.2 |
| 4,669,407 | 6/1987 | Cobb | 114/39.2 X |

Primary Examiner—Charles A. Marmor
Assistant Examiner—Michael Mar
Attorney, Agent, or Firm—Charles F. Gunderson

[57] ABSTRACT

A skate sail, to be held by hand, for propelling an individual on a mobile supportive device, such as skates or a skate board, has a central vertical brace, and a horizontal cross brace whose center is attached to the upper portion of the central vertical brace. Identical spars extend from the base of the central vertical brace past the ends of the horizontal cross brace to which they are secured. The edges of the cloth of the skate sail are secured to, and held tightly by the identical spars. The central, vertical brace may be secured to the central axis of the sail, and the ends of the horizontal cross brace can push the spars apart to keep the sail taut. The individual holds the rig at the intersection of the vertical and horizontal braces, which should be near the center of effort of the sail, in a suitable direction to cause any available wind to propel him on his skates or skate board in any of the possible desired direction.

2 Claims, 1 Drawing Sheet

HAND-HELD SKATE SAIL

BACKGROUND OF THE INVENTION

Sails have been used since almost the beginnings of civilization. With the obvious exception of windmills, most sails have been used to move a boat, or other movable device with the help of the wind.

The genious of early man has left us with many types of sails, shown in innumerable pictures and even carvings over several mileniums. Most of these were, necessarily, designed to take advantage of the primitive sail cloth that was available at those times, along with the available spars, and the necessary rigging, including stays, halyards, and sheets that were equally primitive, but had to be strong enough to hold the mast and control the sails over the predictable winds and weather.

The rigging and sail variation from Egypt to China to the Norways was impressive. The types of sails also reflected the desire to go, not only with the wind, but across the wind, and even against the wind. This led to many types of sails. One goes from the latten rig of the Egyptians, and the Arabs, through medieval barks to multi-mast square riggers and schooners with boom and gaff rigs.

Actually, the most incredible oversight in the very early hulls was the lack of a deep keel, centerboard, or leeboards to reduce what had to be enormous leeway.

We now find the most effecient sailboat is the classic sloop with a single mainsail, on a single spar, and a deep keel. Of course, the sail material is drastically lighter and stronger; and the spars are of metal and even fiber materials that are also lighter, stronger, and can be taller that ever before. This is all supplemented by incredibly-strong wire rigging to hold increasingly-large spars in place. However, one can't help notice similarities to the lateen rigs of the Egyptians and others. In any case, almost all of these sails were attached to a single mast, and moved from port to starboard as the boat was turned to tack or change course.

More exotic uses of sails evolved in the development of skate sails, for example, where there is a large, kite-like device with its own, self-contained spars, that can be hand held and controlled. The sail is symmetrical, and pivoted about a horizontal axis instead of a vertical axis, and the wind is always on one side of the sail. It is moved from side to side, over the skaters head, to move from one tack to another, with the shoulder of the skater carrying the weight of the skate sail and holding it against the force of the wind. The upper and lower parts of the skate sail are reversed from port to starboard tacks, but the luff of the sail always remains at one end.

A newer variation of non-stayed sails is now rampant in the field of wind surfers. Here the base of the spar of the sail is mounted in a pivotable bracket in the windsurf board, and the spar and sail are picked up and held by hand, by means of a wishbone handle that serves as a boom. This is held on one side on the port tack, and on the other side on the starboard tack. The sail is tipped fore and aft to control the turning of the board into and off the wind, and a great degree of skill is required to balance the board, the sail and the rider.

Sails of conventional types have also been used on ice boats, as well as on fairly-large, wheeled land craft, but ice on open lakes is seasonal, and there are fewer and fewer large flat land areas for wheeled craft. The wind surfer type of sail can also be, and is being, adapted to small ice boats, and land vessels with wheels instead of hulls and keels, but even these find fewer areas where they can manoever. In any case, the problems are not quite as simple. The roads, or parking lots, are not as soft or forgiving as the water.

On the other hand, there are very many parking lots and roads and small areas where roller skates, and especially skate boards can be used, and are being used in increasing numbers. Consequently, there is a need for, and a potential demand for, a simple sail that can propel a person on skates, roller or ice, or on a skate board, or the like, that will provide fast motion over a relatively flat surface, with a relatively minimum of effort. This could prove to be an exciting sport, but the larger the sail, and the stronger the wind, the more skill will be required.

Except for the shoulder held skate sail, all of these rigs require a rigid mast attached to the hull or skate board, and the sail must be reversed from port to starboad to go from side to side or tack against the wind.

What is needed, and it is an object of this invention to provide, is a sail that can be hand held, and manoeuvered with respect to the skate board and the operator, to let the operator be driven by the power of the wind, in all directions, basically comparable to the manoeverability of a sail boat or wind surfer.

The sail must be self-contained and structurally intact to be self sufficient; light enough to be hand-held for a reasonable length of time; and should be mechanically foldable for storage and transport.

SUMMARY OF THE INVENTION

A small sail for use by an individual to move him in any normal sailing direction with respect to the wind is fan shaped and held by hand in any desired direction with respect to the wind. The individual sailor can be on skated, ice or roller, or on a skate board or the like, with which he can direct his motion to an angle with, or across, or even somewhat against the wind to be driven by the sail. The fan-shaped sail is symmetrical, with similar spars secured to either side of the edges of the sail. A central vertical brace divides, and is secured to the bases of the two spars, and a cross brace holds the side spars apart, and joins the central brace near the center of effort of the sail where the braces can be hand-held to control the sail.

DETAILED DESCRIPTION OF THE DRAWINGS

Figure 1:
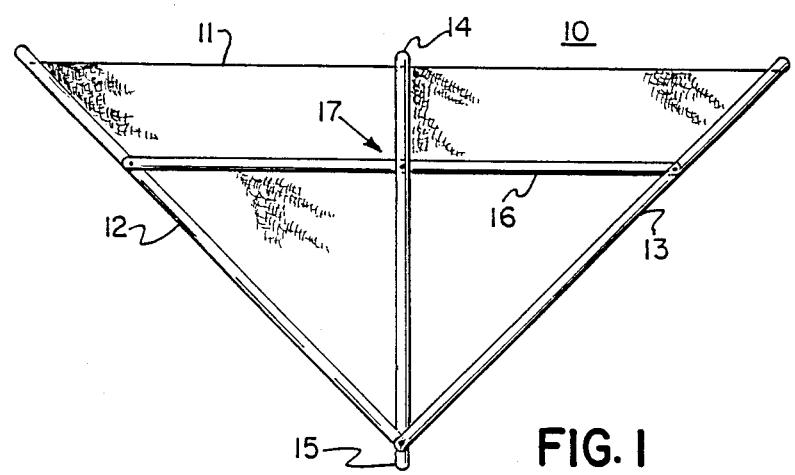
FIG. 1 is a plan view of a typical embodiment of the invention.
Figure 3:
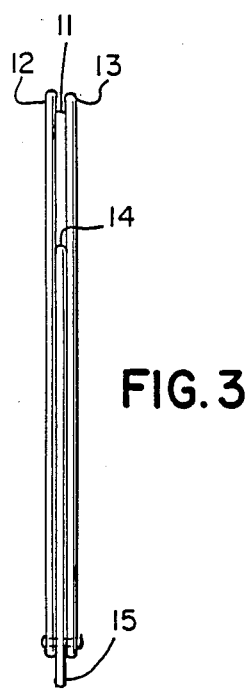
FIG. 3 is a side view of a sail folded for storage.

Referring now more particularly to FIG. 1, a plan view of a basic, hand-held skate sail 10 is shown with sail cloth 11 attached to and supported by spars 12 and 13, on either side. These spars intersect at the base of a central, vertical brace 14, which may be joined to the bases of the spars to provide a pivotable point 15 at the base of the sail. A horizontal cross brace 16 intersects and is attached to the central, vertical brace 14, at 17. The ends of the cross brace 16 attach to and hold the spars 12 and 13 apart to keep the sail 11 taught.

The junction 17 of the central, vertical brace 14 and the cross brace 16 should be at or near the center of effort of the mass of the sail 11 to be hand held at approximately this point. However, movement of the hand, left or right on the horizontal cross brace—or up or down on the vertical center brace—can change the thrust on the sail and, ultimately, the thrust on the skate board, or whatever. Similarly, the turning of the hand or arm, within its physical limitations, can also turn the sail into or a way from the wind to propel the skate board.

Figure 2:
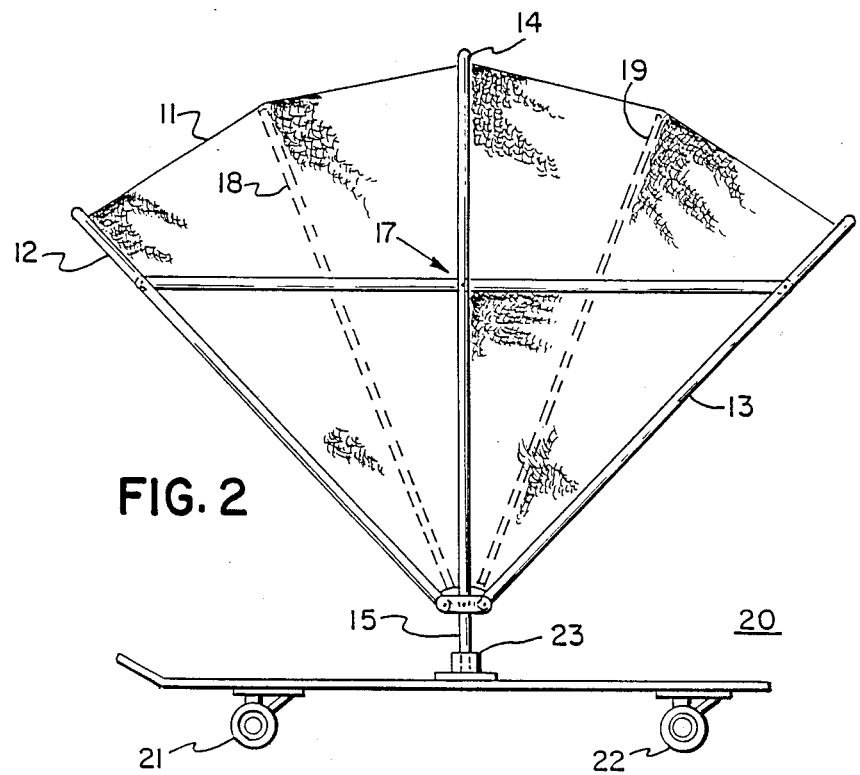
FIG. 2 is a plan view of a variation of the basic concept with a skate board.

FIG. 2 shows a more sophisticated variation of the sail of FIG. 1, with similar element similarly numbered. Here the sail cloth 11 is attached to the spars 12 and 13, which joint at the bottom to the central brace 14, whose end 15 may be extended below the junction as a mounting pivot. The cross brace joins, and is attached to the central brace 14 at 17, at the approximate center of effort of the sail. The ends of the cross brace also attach to, and spread apart the spars 12 and 13 to keep the sail taught.

FIG. 2 shows a fan-like conformation, with all of the bracing rods and spars of equal length to fold evenly together. Additional battens 18 and 19, of equal length can be fitted into the sail to provide support for the sail, and improve its effeciency, while still folding together for storage and handling. The battens may, or may not be attached to the cross brace. The cross brace may also be of the same length as the other elements for easy storage.

FIG. 2 also shows a typical skateboard 20, with wheels 21 and 22. A bracket 23 may also be provided to hold the extended base 15 of the central brace 14 to stabilize the sail and ease the load of the hand-held sail on the sailor, particularly over long periods of use, or when larger and more challenging sails may be tried.

There are many variations of this device within the scope of this invention. The size and shape of the sail may be varied. The material may be varied. A standard sail cloth may be used, as well as plastic materials. Tha sail may be of conventional, opaque cloth, or of translucent, or transparent materials.

The basic embodiment of FIG. 1 shows a flat top, that will normally be held at, or just below, eye level so that the skater has a clear view of his surroundings, for safety sake, since speeds will increase with the strength of the wind. If higher sails are desired, for more-skilled sailors, or for areas with lesser winds, the upper portion of the sail can be transparent, or have a window, as in conventional wind surfing rigs, as well as in many conventional small sailing boat rigs.

The lower portion of the sail, next to the ground, within the apex of the triangle serves little useful purpose, and may be eliminated. This could simplify the sail, and bring the bulk of it up to its most efficient level. It is well known that wind velocities increase with height—above the friction of the ground—so it is desirable to bring the sail as far above the ground level as is practical to have a clear flow of air within the scope of this simple device.

It should be noted, again, that this is an unique, simple, symmetrical sail that is pulled against the wind, rather than pushed against the wind, and that it presents only one side to the wind, which is easier to improve aerodynamically. However, unlike the horizontally-turned skate sail, this sail is turned on a vertical axis with reversible luffs along the spars 12 and 13, to turn into the wind from port to starboard tacks.

I claim:

1. In combination, a skateboard having a substantially planar upper surface, a lower surface with wheels attached thereto, and a hand-held sail attached to said upper surface, said sail comprising: a central vertical brace, a pair of identical spars, a lower end of each spar being connected to said central brace at a pivotal connection located adjacent the lower portion of said central brace, said central brace being of substantially the same length as said spars, a horizontal cross brace releasably secured to said central brace, said cross brace having end portions releasably secured to respective ones of said spars at a location above the midpoint of each spar, wherein said spars extend upwardly and outwardly from opposite sides of said central brace and wherein the horizontal distance between the upper end of each said spar and said central brace is substantially equal to the vertical distance between the upper end of each said spar and a horizontal plane intersecting said pivotal connection, a single piece of sail cloth secured to said spars and extending therebetween, said sail cloth having an upper edge configuration which extends to a location proximate the upper ends of each of said central brace and said spars, said sail cloth being tightly drawn between said spars when said cross brace is secured to said central brace and said spars, battens fitted within said sail and extending upwardly and outwardly between said central brace and said spars, and a socket secured to the upper surface of the skateboard for rotatably receiving and supporting the lower portion of said central brace about an axis extending perpendicular to the upper surface of the skateboard.

2. The combination as set forth in claim 1, wherein said sail cloth has an upper portion which is transparent.

* * * * *